A. L. CHEEK.
VALVE.
APPLICATION FILED NOV. 18, 1919.
1,362,526.  Patented Dec. 14, 1920.
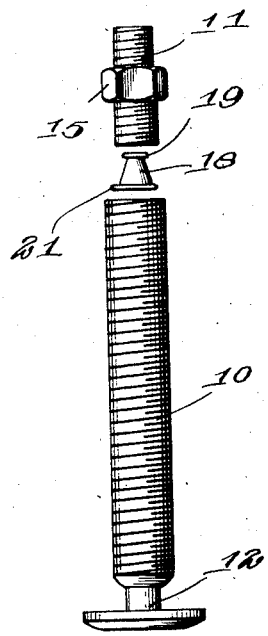
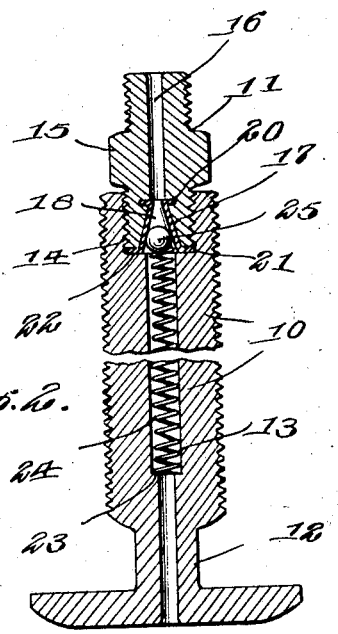
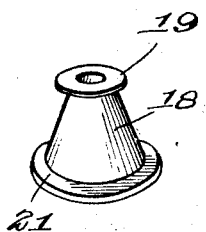
WITNESS:
Frederick L. Fox.
INVENTOR.
BY A. L. Cheek.
Victor J. Evans.
ATTORNEY.

UNITED STATES PATENT OFFICE.

ALEX L. CHEEK, OF ROXTON, TEXAS.

VALVE.

1,362,526.

Specification of Letters Patent.  Patented Dec. 14, 1920.

Application filed November 18, 1919. Serial No. 338,809.

*To all whom it may concern:*

Be it known that I, ALEX L. CHEEK, a citizen of the United States, residing at Roxton, in the county of Lamar and State of Texas, have invented new and useful Improvements in Valves, of which the following is a specification.

This invention relates to valves and has particular application to that class of valves used in conjunction with pneumatic inner tubes, the invention residing in the construction, combination and arrangement of parts which prevent leakage of the valve.

The nature and advantages of the invention will be better understood when the following detail description is taken in connection with the accompanying drawings, wherein like numerals of reference indicate similar parts in the several views, and in which:—

Figure 1 is a view showing the component parts of the invention separated.

Fig. 2 is a vertical sectional view through the valve.

Fig. 3 is a perspective view of the cone shaped member or packing.

The valve constructed in accordance with my invention embodies a tubular relatively long section 10, and a relatively short section 11. The section 10 is reduced as at 12 to provide a neck for association with the inner tube in the usual manner, the inner tube not being shown. The section 10 is provided with a longitudinal bore 13, which opens into a counter bore 14 at one end of the section. The section 11 is externally threaded adjacent its opposite ends and is adapted to be threaded into the counter-bore 14. The section 11 is provided with an enlarged angular intermediate portion 15 to accommodate a tool for associating the sections or disassembling the parts as the occasion may require. The section 11 is also provided with a longitudinal bore opening at both ends, the bore indicated at 16 being substantially cone-shaped at one end as at 17. The portion 17 of the bore is adapted to receive a substantially cone shaped packing member which is indicated in Fig. 3, which member is preferably constructed from rubber, or any other suitable material may be utilized in its projection. The packing 18 is within the cone-shaped portion of the bore 17, the packing having a flange 19 around its smaller extremity which is fitted within an internal groove 20 provided in the section 11. The opposite end of the member 18 is also provided with a flange 21 which embraces or surrounds the adjacent end of the section 11. When the section 11 is threaded into the counter-bore 14, the flange 21 of the packing member is interposed adjacent the section 11 and the shoulder 22 formed in the section 10. By reason of this construction, the packing member is effectively secured between the respective sections of the valve, and is arranged to prevent leakage of the latter, the flange 19 being fitted within the groove 20 of the section 11 preventing the packing from being closed or collapsed when air is introduced into the valve. The section 10 is provided with a shoulder 23 adjacent the neck 12, and upon this shoulder is seated one end of a coil spring 24, the spring being disposed within the bore and having its opposite end bearing against a ball valve 25, normally holding the latter seated within the packing member 18. Manifestly, when air is introduced into the valve through the section 11, the valve is moved away from the seat against the tension of the spring, and when the tube has been properly inflated the spring returns the valve 25 to normal position. The construction is such that the component parts can be readily separated for the purpose of cleaning the same or for the purpose of repairs when the occasion requires.

While I have shown and described what I consider the preferred embodiment of the invention, I desire to have it understood that I do not limit myself in this connection, and that such changes may be resorted to when desired as fall within the scope of what is claimed.

Having thus described my invention what I claim as new is:—

A valve comprising detachably connected sections having alined bores, the bore in one section being substantially cone shaped for a portion of its length, said section having an annular groove, a packing sleeve fitted in said cone shaped portion, a flange around each end of the sleeve, one flange being fitted in said groove, the other flange embracing the adjacent end of said section and adapted to be impinged between said sections when the latter are associated, and a valve arranged between said sections and operating in said sleeve.

ALEX L. CHEEK.